UNITED STATES PATENT OFFICE.

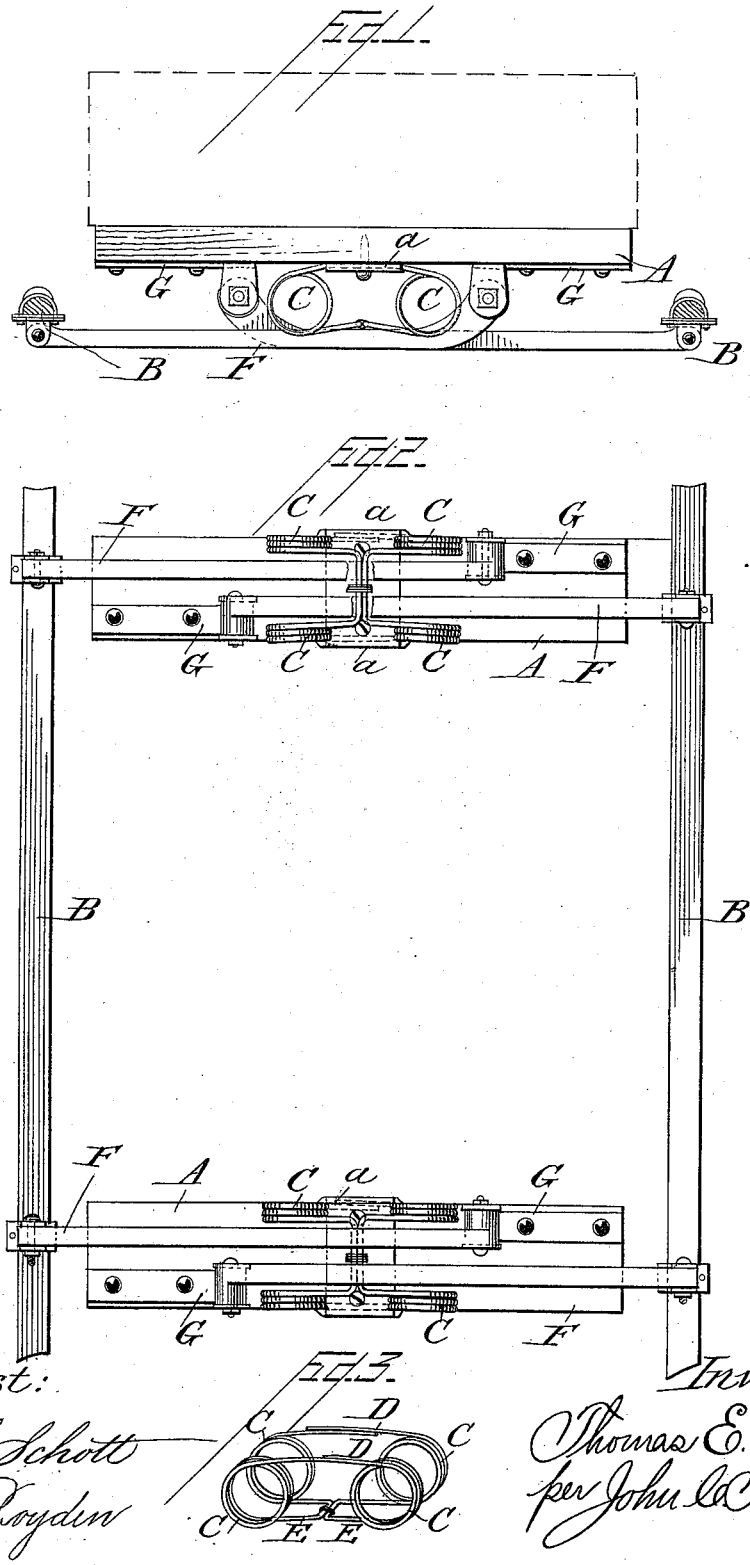

THOMAS E. ALLEN, OF AMSTERDAM, NEW YORK.

VEHICLE-SPRING.

SPECIFICATION forming part of Letters Patent No. 417,461, dated December 17, 1889.

Application filed April 9, 1889. Serial No. 306,515. (No model.)

*To all whom it may concern:*

Be it known that I, THOMAS E. ALLEN, a citizen of the United States, residing at Amsterdam, in the county of Montgomery and State of New York, have invented certain new and useful Improvements in Vehicle-Springs; and I do hereby declare the following to be a full, clear, and exact description of the invention, such as will enable others skilled in the art to which it appertains to make and use the same.

This invention relates to an improvement in vehicle-springs, especially that class of springs which are used with vehicles having side bars, the object of the invention being to so construct and arrange the springs as to permit the equilibrium of the load carried by the wagon or other vehicle; and the invention consists in the construction, arrangement, and combination of parts, substantially as will be hereinafter described and claimed.

In the accompanying drawings, illustrating my invention, Figure 1 is a side elevation of the bottom of a vehicle, one of its side bars and my improved vehicle-spring arranged in connection with said parts. Fig. 2 is a bottom plan view of the under portions of the vehicle, its side bars and my improved vehicle-spring arranged at the front and rear of a vehicle. Fig. 3 is a reverse perspective view of the spring itself, showing in detail its construction.

Similar letters of reference designate corresponding parts throughout the different figures of the drawings.

A A denote certain parts of the bottom of the vehicle; B B, the side bars of said vehicle.

It will be noted that my improved vehicle-spring is adapted for use with any kind of a vehicle, and the illustration in the drawings of any one particular form of such vehicle is given by way of example merely, and I do not intend to be confined to the precise style of vehicle therein delineated.

One of my improved vehicle-springs is preferably arranged transversely of the vehicle at front and rear thereof, substantially in the manner shown in Fig. 2. This spring is made of any suitable elastic substance—steel, brass, or rubber.

I have used a coiled-wire spring to illustrate my invention; but any kind of a spring located between the hangers G G or outside of hangers G G, but operating upon levers F F between hangers G G, will accomplish the same result.

I do not wish to be confined to the coiled spring; but use it to explain my invention.

The coiled spring is made of any suitable kind of wire of the proper size and strength, and has four coils C C C C, which coils lie in the same horizontal plane and are arranged in the form of a rectangle. The wire portions D D, which connect the opposite coils of the spring, are confined to the bottom portions A A of the vehicle by means of suitable metallic strips or plates *a a*, fastened to said parts A A and binding the wire portions D D tightly between themselves and the parts A A, as shown in Fig. 2. The right-angled wire loops E E, which connect the wire coils C C on the under side and in a way opposite to that in which they are connected by means of the wire portions D D, are themselves suitably fastened together. When the right-angled loops are connected, they will be in such a position as to afford a bearing for the transverse levers F F, which rest upon these wire loops E E in the manner shown in the drawings, and especially in Fig. 2. The transverse levers F F are hinged at their outer ends to hangers on the side bars B B of the vehicle, and at their inner ends they are suitably pivoted to the hangers or bearings G G, secured on the bottom portions A A of the vehicle. It will thus be manifest that with the parts of the invention arranged in the manner just described the levers F F will operate upon the quadruple coiled springs. These springs being firmly held by the vehicle, it is clear that any load carried by said vehicle will be supported in equilibrium, for the springs, in conjunction with the leverage described, will make the carriage of the load easy and steady.

Having thus described my invention, what I claim as new, and desire to secure by Letters Patent, is—

1. In a vehicle-spring for side-bar vehicles, a quadruple coiled spring secured to the under side of the vehicle, in combination with the side bars and suitable leverage, substantially as described.

2. In a vehicle-spring for side-bar vehicles, the combination, with the quadruple coiled springs, of the side bars and the transverse levers pivoted to the side bars and to the vehicle and resting upon the parts of the spring which connect its coils, substantially as described.

3. The herein-described vehicle-spring, consisting of the four coils C C C C, connected by the wire portions D D, and the right-angled loops E E, which loops are themselves connected as described, in combination with the side bars and the transverse levers pivoted to the side bars and to the bottom of the vehicle and operating upon the right-angled loops E E, substantially as described.

4. The combination of the quadruple coiled springs, having the right-angled wire loops E E fastened together, the side bars B B, the levers F F, pivoted to the side bars, and the bearings G G, to which the other ends of said levers are pivoted, said levers operating upon the right-angled portions E E of the spring, all substantially as described.

5. The combination of the bottom portion of the vehicle, the springs connected thereto, the transverse levers F F, hinged at their outer ends to suitable hangers, the bearings G G, to which the other ends of said levers are pivotally connected, all arranged, as specified, so that the said levers may operate upon the springs, substantially as described.

In testimony whereof I affix my signature in presence of two witnesses.

THOS. E. ALLEN.

Witnesses:
M. L. STOVER,
A. H. DEGRAFF.